3,846,114
METHOD FOR KILLING MOSS

Werner Perkow, Hamburg, Germany, assignor to Norddeutsche Affinerie, Hamburg, and C. F. Spiess & Sohn, Kleinkarlbach, Germany
No Drawing. Filed Mar. 9, 1970, Ser. No. 17,914
Int. Cl. A01n 9/20
U.S. Cl. 71—97                    3 Claims

ABSTRACT OF THE DISCLOSURE

Biocidal compositions for the destroying and preventing of the growth of mosses in which the active ingredient thereof is amino salts or amino-metal double salt complexes of pentachlorophenol.

---

Available on today's market are numerous means and methods for the killing of undesirable and objectionable green plants utilizing chemical compounds which are known as herbicides. One class of such chemical compounds destroys the entire plant growth as a "total herbicide," while another class of different compounds eliminates as a "selective herbicide" only certain undesirable types of plants within a whole spectrum of plant culture. Compounds, for example, from the classes of the substituted phenoxy acetic acids, benzoic acids, phenyl acetic acids, carbamates, thiocarbamates, urea and triazines derivatives and pyridazone derivatives all have become known as a result of their properties and characteristics as materials that either destroy plants or severely restrict the growth of such plants. Such compounds have been described in numerous publications and have become known as auxiliary means that are almost impossible to be without in the agricultural growing of cultured plants.

A major disadvantage, however, with the above mentioned compounds, as well as with other herbicides, is the fact that such materials are almost completely, or at least to a great extent, ineffective against mosses. The growth and other physiological conditions in the life span of most types of mosses differ greatly from those of the monocotyle and dicotyle types of plants, which are generally known as weeds. As the result of these physiological and herbicidical differences of the plants with respect to the herbicides used, it is generally the case that the growth of moss starts to get out of hand in an undesirable manner on those ground areas that have been treated with various weed killers. Also, for example, in a well kept lawn, it is possible that various mosses will exist which will comprise part of the undesirable weeds which easily crowd out the desired grass. It has been recommended, as a counter measure when these conditions exist, to distribute ferrous sulfate in large quantities evenly across the lawn. However, such use gives rise to other undesirable consequences due to the fact that the ground will become too acid.

Surprisingly, it has been found that amino salts and especially amino-metal double salt complexes of pentachlorophenol, have specific effects, which have been hitherto unknown, against the types of moss that customarily grow on lawns and which have been found to be undesirable. Pentachlorophenol, alkali metal salts and esters thereof, especially those containing long-chained aliphatic radicals, are known to possess other biocidic characteristics.

Thus, for instance, pentachlorophenol and its derivatives have been employed as a fungicide and bactericide primarily for the prevention of molds occurring in and on cellulose products and starch products, dyes, glues, leather, textiles, and other raw materials and semi-finished products which are capable of supporting molds. Under certain specific conditions the compound can also be used for the elimination of snails. A further area of use for pentachlorophenol is that of an insecticide and fungicide for the protection of wood. Pentachlorophenol has also been used in the selective killing of certain weeds in a few areas, primarily in the cultivation of sugar cane and rice. However, the use of pentachlorophenol as a general treating agent for the killing of weeds has, so far, been without any material significance.

The pentachlorophenol derivatives which have been found, in accordance with the present invention, to be of particular utility in destroying moss includes, on the one hand, the salts with primary, secondary and tertiary amines and alkanol-amines, including the amines with several nitrogen functions and among those, particularly the aliphatic diamines and triamines. These light crystalline salts, which can be produced quite economically, possess, for the most part, middle to low solubility in water and are, in general, easily soluble in conventional organic solvents and similar solutions. The compounds can be prepared in a conventional manner and used in the form of a dusting powder, granules, spray powder or an emulsion concentrate. The necessary amounts that have to be employed lie in the range between 0.5 and 10 kg./hectare. The moss killing effect will be found to show up relatively quickly after treatment for a few days. Thereafter it will be found that the moss plants have first turned brown and then will gradually die. Grass forming a well-kept lawn or other cultured plants will be found to be damaged, either slightly and/or temporary, by the quantities of pentachlorophenol salts that are used in order to be effective against the moss. These compounds, along with the amino-metal double salt complexes of pentachlorophenol mentioned hereinafter, have been found suitable and give excellent results when combined with or in herbicides that are readily available on the open market to prevent the growing of moss, as the subsequent flora, on the surface so treated.

The above-mentioned amino salts of pentachlorophenol are capable of being converted into double salts and/or complexes by the addition of metal salts. These compounds or complexes are, for the most part and for all practical purposes, insoluble in water. Such materials cling to the surface of the moss and are effective over a long period of time, and will not be dissolved and washed into the ground by rain, regardless of the extent of the rain. If a larger dose than that required has been applied through inadvertence or by mistake, no damage by the use of these moss killing means will be done, in any case, to the roots of other plants.

The effect of the composition on the flora of the moss requires a little longer time than in the case when the amino salts are used, but the effectiveness will be found to be more lasting and, in most cases, up to a period of one year. These pentachlorophenol complexes are fairly harmless to other cultural plants and much less so than when pentachlorophenol amino salts are used. The compounds or complexes are also particularly suitable for use in combination with or in macro and/or micro fertilizing medium means and/or pesticides, or in other biocidic means, such as, for example, herbicides, fungicides or insecticides, or any mixtures thereof.

Examples of such amino salts of pentachlorophenol that have been found to possess the desired characteristics of killing mosses are the following compounds. The number can be increased by further addition of salts having a nitrogen containing base with pentachlorophenol.

| | Melting point |
|---|---|
| Salt of pentachlorophenol with methylamine | Approx. 230° with decomposition. |
| Salt of pentachlorophenol with propylamine | 165°. |
| Salt of pentachlorophenol with butylamine | 167°. |
| Salt of pentachlorophenol with diethylamine | 212°. |
| Salt of pentachlorophenol with allylamine | 185°. |
| Salt of pentachlorophenol with dodecylamine | 68°. |
| Salt of pentachlorophenol with ethanolamine | 188°. |
| Salt of pentachlorophenol with diethanolamine | 178°. |
| Salt of pentachlorophenol with triethanolamine | 138°. |
| Salt of pentachlorophenol with cyclohexylamine | 183°. |
| Salt of pentachlorophenol with ethylendiamine | Approx. 235° with decomposition. |
| Salt of pentachlorophenol with diethylentriamine | Approx. 230° with decomposition. |
| Salt of pentachlorophenol with hexamethylentetramine | Approx. 230° with decomposition. |

The production of these compounds or complexes can be carried out in a well-known manner, such as, for example, by the reaction of molar quantities of the components in an organic solution or solvent, such as, for example, ethyl alcohol. It is also possible to precipitate the salts in some cases, which are very difficult to dissolve in water, by having a molar quantity of mineral acid drip into the solution of the mixture of sodium pentachlorophenolate and amine.

Examples for the metal amino complexes or double salts of pentachlorophenol which are especially difficult to dissolve are:

Copper - ethylendiamine - pentachlorophenol - complex which is produced by the addition of 2 mol weight of ethylendiamine to an aqueous solution of 1 mol weight copper vitriol and a subsequent addition of 2 mol weight of sodium-pentachlorophenolate. This produces a green amorphous product having no melting point and which is practically indissolvable in water. 1 mol weight of $Na_2SO_4$ is released during the reaction and this remains in the solution.

Copper diethylene triamine - pentachlorophenol - complex, produced as above described, in a mol ratio of one to two to two is a product having a greenish color and has the same identical characteristics.

Copper-dodecylamine pentachlorophenol-complex, as above described, in a mol ratio of one to two to two is a product having a light brown color.

Nickel-ethylene diamine pentachlorophenol-complex, produced as above described, using nickel sulfate, ethylene diamine and sodium pentachlorophenolate in a mol ratio of one to two to two produces a product having a slightly yellow color.

Nickel diethylene triamine pentachlorophenol-complex, as above described, in a mol ratio of one to two to two is a product having a slightly lavender color.

Zinc ethylene diamine pentachlorophenol-complex, produced as described above, in a mol ratio of one to two to two produces a faintly yellow compound.

The various types of moss which can be successfully treated with the inventive complexes, i.e., with the amino salts of the pentachlorophenol and the amino metal complexes of pentachlorophenol are, for example, the following:

*Hypnum arcuatum*
*Weissia viridula*
*Polytrichum commune*
*Polytrichum piliferum*
*Rhacomtrium canescens*
*Pleurozium schreberi*
*Funaria hygrometrica*
*Dicranum scoparium*
*Ceratodon purpureus.*

Of particular utility is the use of the hiacide which contains a mixture of one or more of the salts of pentachlorophenol with primary, secondary or tertiary amines, alkanolamines or bases with several nitrogen substituents with one or more of the metal amino complexes of pentachlorophenol. The growth of mosses can be effectively and rapidly destroyed by the use of these compounds and a new growth of moss can be prevented for a long period of time.

EXAMPLE 1

2.5 kg. of ethylene diamine salt of pentachlorophenol were dissolved in 7 litres of cyclohexanone and a non-ionic wetting agents in the amount of 0.5 kg. was added, the wetting agent being of the type of the sebacic acid ethylene oxide adducts. 10 ml. of this mixture was dissolved in 100 ml. of water and the solution then sprayed onto a 10 qm. surface on which *Ceratodon purpureus* is growing. The moss, beginning at the very tips, began to take on a brownish color after a few days and then started to die.

EXAMPLE 2

50 kg. of ethanolamine salt of pentachlorophenol, 30 kg. of finely granulated chalk, 10 kg. of silicic acid and 10 kg. of calcium-lignin-sulfonate are mixed and then ground to produce a spray powder that is suspendable in water, 400 g. of this mixture was suspended in 60 litres of water and was sprayed onto a manicured lawn of the festuca type having a surface of 1000 qm. which has been heavily infiltrated by mosses of the type *Dicranum scoparium* and *Pleurozium schreberi*. This treatment resulted in a total elimination of the growth of the mosses without damaging the growth of the grass.

EXAMPLE 3

A spray powder containing 50% of finely ground diethylene triamine - zinc - pentachlorophenol-complex was produced in accordance with the same procedure as set forth in Example 2. 500 g. of this material was suspended in 100 litres of a fertilizer solution containing 2% of urea, 1% of calcium nitrate, and 0.5% of magnesium sulfate. This mixture was then applied to a manicured lawn having a surface of 1000 qm. infiltrated by moss in the manner as described in Example 2 above. The addition of the fertilizer takes care that the bare spots that are created when the moss dies off are quickly covered by a new growth of grass. The stability of the zinc-amino-pentachlorophenol-complex will prevent the renewed growing of moss for quite a long time.

EXAMPLE 4

Finely powdered copper ethylene-diamine-pentachlorophenol-complex was mixed in an amount of 25% of the final weight of the mixture with a total herbicide brought on the open market and containing as active ingredients of 50% thereof N.N - dimethyl-N-(3.4-dichlorophenyl) urea and sodium salt of the 2.4.5-trichlorophenoxy-acetic acid. The resulting mixture was then sprayed, as an aqueous solution, in an amount of 20 kg./ha. onto a surface area that is overgrown with weeds and moss. The addition of the pentachlorophenol-complex prevented, after the growth of the moss had been destroyed, any new growth of moss for a long period of time.

EXAMPLE 5

To a total herbicide, which contains aside from the customary inert and additional material, as the active ingredients of 60% of the total weight, 2-chloro-4,6-bis-(ethylamino)-1,3,5-triazine, which is also known as Simazine, and 3-amino 1,2,4-triazol, which is also known as Amitrol, there was admixed in an amount of 25% of the total weight of the mixture, diethylene triamino salt of pentachlorophenol and homogeneously ground to produce a sprayable powder. After spraying out the suspendable products in an aqueous solution and at a quantity of 15 kg./ha. onto a grass surface overgrown with moss, there was an observable increase in the general killing effect of the herbicide in contrast to the results using a comparable product without the addition of the pentachlorophenol amino salt, as well as the moss was prevented from growing on the surface area treated with the composition for some time.

I claim:

1. The method of killing mosses and the prevention of the growth of mosses in any given area comprising applying a biocidal composition to the area containing the mosses, said biocidal composition comprising a carrier and a biocidally effective amount of a compound selected from the group consisting of copper-ethylenediamine-pentachlorophenol complex, nickel-ethylenediamine-pentachlorophenol complex, zinc - ethylenediamine - pentachlorophenol complex, zinc-diethylenetriamine-pentachlorophenol complex, and mixtures of the foregoing.

2. The method in accordance with claim 1, wherein said biocidal composition further contains a minor amount of a compound selected from the group consisting of the ethylenediamine salt of pentachlorophenol and the diethylenetriamine salt of pentachlorophenol.

3. The method in accordance with claim 1 wherein the carrier of said composition is a liquid and the composition is applied in the form of a liquid spray.

References Cited

Harrod: Canadian Journal of Chemistry (1969), 47(4), Feb. 15, 637–45.
Tsunoda: Chem. Abst., vol. 64 (1966), 8861c.
Tsunoda: Chem. Abst., vol. 64 (1966), 8861d.
Pridham: Chem. Abst., vol. 47 (1953), 4031i.

LEWIS GOTTS, Primary Examiner
C. L. MILLS, Assistant Examiner

U.S. Cl. X.R.

71—121, 122